United States Patent

[11] 3,559,652

| [72] | Inventors | Elden H. Banitt;<br>Robert A. Nelson, St. Paul, Minn. |
|---|---|---|
| [21] | Appl. No. | 749,996 |
| [22] | Filed | Aug. 5, 1968 |
| [45] | Patented | Feb. 2, 1971 |
| [73] | Assignee | Minnesota Mining and Manufacturing Company<br>St. Paul, Minn.<br>a corporation of Delaware |

[54] METHOD OF ADHESIVELY REPAIRING BODY TISSUE WITH ALKOXYALKYL 2-CYANOACRYLATE
15 Claims, No Drawings

[52] U.S. Cl.................................................... 128/334, 260/78.4

[51] Int. Cl....................................................... A61b 17/04
[50] Field of Search........................................... 178/334, 335, 335.5; 260/78.4

[56] References Cited
UNITED STATES PATENTS

| 3,223,083 | 12/1965 | Cobey........................ | 128/334X |
| 3,264,249 | 8/1966 | Araki et al. .................... | 128/334X |
| 3,483,870 | 12/1969 | Coover et al. ................ | 128/334 |

*Primary Examiner*—Dalton L. Truluck
*Attorney*—Kinney, Alexander, Sell, Steldt and Delahunt ABSTRACT: The invention relates to a method for surgically adhering living tissues and effecting hemostasis therein by means of a rapidly polymerizing composition which comprises alkoxyalkyl 2-cyanoacrylates.

METHOD OF ADHESIVELY REPAIRING BODY TISSUE WITH ALKOXYALKYL 2-CYANOACRYLATE

This invention relates to improvements in the surgical coaptation or repair of injured mammalian body tissues. More particularly, the invention relates to such improved methods wherein the agent for said repair is a solventless, rapidly polymerizing adhesive composition which includes monomeric alkoxyalkyl 2-cyanoacrylates.

For many years the usual methods for surgical tissue closure or repair have employed fundamental techniques such as the use of clamps, staples and a variety of suture materials. The disadvantages inherent in these methods, however, have given rise to the development of new approaches to the joining together of damaged mammalian tissues as well as for preventing the escape of blood or fluids therethrough. Accordingly, there have recently appeared in the art biological adhesive and hemostasis-inducing compositions comprising essentially fast curing monomers.

Principally, two classes of compounds have been employed in known tissue adhesive compositions; namely, monomeric dialkyl methylene malonates (U.S. Pat. No. 3,221,745) and monomeric lower alkyl 2-cyanoacrylates (U.S. Pat. Nos. 3,223,083 and 3,264,249). However, these monomers have exhibited properties which tend to impair their utility in the biological area. For example, bonds formed with unsubstituted alkyl 2-cyanoacrylates exhibit little flexibility and tend to be highly brittle and friable; see, e.g., Abstracts, Div. of Organic Coatings and Plastics Chemistry, ACS Meeting, 24, 249—257, Sept. (1964). Furthermore, the alkyl 2-cyanoacrylates do not appear to combine the required properties of low toxicity and adequate absorption by the tissues. There is evidence, for example, that methyl 2-cyanoacrylate exhibits an undesirable degree of histotoxicity; see, e.g., Arch. Surg., 94, 153—156 (1967) and J. Biomed. Mater. Res., 1, 3—9 (1967) The n-butyl and isobutyl 2-cyanoacrylate monomers are absorbed only very slowly by the tissues, and polymeric adhesive residue has been observed by histologic examination at the site of application as much as twelve months after surgery; see, e.g., Medical World News, 8, (29) 27 (1967). Other observations of disadvantages associated with known tissue adhesive and hemostasis-inducing compositions reported in the literature include references to slow assimilation of solid adhesive by the body, poor wetting characteristics of the adhesive and excessively fast monomer set time in tissue coaptation applications.

Intensive investigation of the adaptability of the alkyl 2-cyanoacrylates in tissue adhesives and hemostasis-inducing compounds has indicated that the acute inflammatory response elicited by methyl 2-cyanoacrylate could be reduced by employing higher homologues (i.e. butyl and higher cyanoacrylates) which are somewhat better tolerated by the tissues. However, in thus reducing local toxicity and inflammation, a definite undesirable reduction in the rate of biodegradation of polymer was observed with the higher homologues. Thus, it appears that in providing a tissue adhesive and hemostasis-inducing composition comprising alkyl 2-cyanoacrylates with an acceptable degree of local toxicity and inflammation, it has been necessary to sacrifice a certain degree of biodegradability. Biodegradability is an important consideration since the polymeric film should be replaced as soon as possible by the body's own contiguous tissue and should not serve as a barrier to subsequent healing. Other detrimental effects of a foreign body, such as polymeric residue, in the tissues for a prolonged period of time can only be surmised at this time. Furthermore, the relatively brittle and friable nature of the polymeric bonds formed by the alkyl 2-cyanoacrylates is undesirable in the presence of soft, or spongy tissues.

Accordingly, it is an object of the present invention to provide a method for repairing damaged mammalian tissues through the use of a biological tissue adhesive and hemostasis-inducing composition which overcomes the disadvantages of the prior art in that the composition employed effectively bonds to living mammalian tissue with minimal local toxicity and minimal inflammation of the tissues while at the same time being biodegraded at an acceptable rate after the natural healing process is established.

A further object is to provide a method for repairing damaged mammalian tissue through the use of a tissue adhesive and hemostasis-inducing composition which wets and spreads on tissue substrates and which polymerizes at a rate which is conducive to ease in handling and application.

Another object of the invention is to provide a method for repairing damaged mammalian tissue through the use of a biological tissue adhesive and hemostasis-inducing composition which polymerizes to form bonds which are sufficiently flexible to allow movement of the living tissues with which it forms said bonds.

The present invention is based on the unexpected observation that monomeric alkoxyalkyl 2-cyanoacrylate, when employed as the major adhesive component of a tissue adhesive and hemostasis-inducing composition, is effective in alleviating many of the disadvantages mentioned above as well as in attaining the objects of the invention.

The utility of alkoxyalkyl 2-cyanoacrylates in the adhesives of the invention results from the unusual combination of advantageous properties which makes them particularly adaptable for use in biological systems, for example, the rate of polymerization of the alkoxyalkyl 2-cyanoacrylates of the invention is such that it allows rapid and secure bonding, but yet allows the surgeon adequate working time before the bond becomes firmly fixed. Polymerization rate is noted to be important primarily because if it is too rapid a poor bond may result due to, for example, improper alignment of the tissues to be adhered, which may not be correctable before a rapidly polymerizing monomer has cured. Butyl 2-cyanoacrylate for example, polymerizes at such a rapid rate that effective application is often extremely difficult, particularly in cases where the monomer is applied in liquid form. It is further noted that the amount of polymerization inhibitor required to efficiently reduce the cure rate of butyl 2-cyanoacrylate is such that the bond is adversely affected, e.g. weakened; see Matsumoto, et al. Arch. Surg., 94, 153—156 (1967). (1967) Conversely, tissue bonds formed by exceedingly slowly polymerizing monomers can be weakened by body fluids which may penetrate into the adhesives during bond formation. The tensile strength of bonds formed by adhesives of the invention, for example with epithelial tissue in rats, indicates that tissue bonds thus formed are more than strong enough to maintain the tissue surfaces to be repaired in correct apposition with each other until they can be permanently joined by the natural healing process. The bonds themselves are sufficiently flexible to permit movement of the tissues during the healing process. Said bonds are neither subject to easy fracture upon sudden shock nor are they likely to cause undue restriction or irritation or pulsating or parenchymatous tissue. This desirable degree of bond flexibility is not suggested by the biological adhesives presently known in the art. Furthermore, and perhaps most importantly, tissue bonds formed by the adhesives of the invention are biodegradable within an acceptable period of time after the normal healing process has been established. Thus, for example, a preferred compound of the invention, 2-methoxyetyl 2-cyanoacrylate, after having been implanted in the subcutaneous tissue of mice in the form of a 50 mg disc of polymer, was 100 percent biodegraded within a sixteen week period. A similar test run with butyl 2-cyanoacrylate demonstrated that only 1.2 percent was biodegraded within the sixteen week period. See Example V, below, for further data.

The alkoxyalkyl 2-cyanocrylates of the invention are converted from the liquid to the solid state by polymerization when spread over a moist surface or pressed into a thin film between the two adherend surfaces. Bonding action is the result of anionic polymerization which is initiated by weakly basic substances, such as water, which are normally found in living tissue. Although polymerization occurs rapidly when the monomers are spread in thin films, the cyanoacrylate monomers of the invention have good stability (at least 6 months) when stored in bulk in admixture with small amounts of polymerization inhibitor in a moisture-free sealed container under refrigerated conditions. Modification of the cure rate can also be accomplished by employing typical cyanoacrylate polymerization inhibitors. In low concentration, polymerization inhibitors impart acceptable shelf life to the adhesive composition without interfering with adhesive utility. Suitable inhibitors or stabilizers include Lewis acids, such as sulfur dioxide, nitric oxide, boron trifluoride, and other acidic substances, including hydroquinone, monomethyl ether hydroquinone, nitrohydroquinone, catechol and monoethyl ether hydroquinone. Conversely, polymerization accelerators, such as amines or alcohols may be added if an increased cure rate is desired. One or more of the aforementioned substances may be used, desirably in concentrations of 25 to 1,000 parts per million.

Adjuvant substances, such as thickening agents, plasticizers, and the like can also be added to improve the adaptability of the composition. Obviously, such adjuvant materials as may be selected must be biologically acceptable and should not cause premature polymerization of the adhesive for its intended use. Examples of suitable plasticizers include esters of cyanoacetic, succinic, sebacic and phthalic acids, glycerol triacetate, glycerol tributyrate or other substances, such as described by Joyner et al. U.S. Pat. No. 2,784,127. In many applications, alkoxyalkyl 2-cyanoacrylates are effective when employed alone in the adhesives of the invention. However, in certain surgical procedures and situations, it may be desirable to increase the viscosity of the adhesive. Thus, thickeners or viscosity agents may be added to the stabilized adhesive in order to advantageously modify the surgical utility thereof. Suitable biologically inert thickeners include poly(alkyl cyanoacrylates), poly(acrylates), poly(methacrylates), cellulose acetate and similar cellulose esters or other polymeric materials which do not react with the monomer to cause premature polymerization and are preferably miscible therewith.

Adhesive compositions which include as the major active constituent the cyanoacrylates of the invention, are useful in a variety of surgical procedures such as, for example, the closure of the skin wounds, the sealing of parenchymatous tissue, intestinal anastomosis and repair of vascular organs. When such adhesive compositions are applied in the form of a fine aerosol spray, they are particularly effective in controlling hemorrhage or sealing such organs as the spleen, kidney, liver, lungs or pancreas after inadvertent damage or surgical incision. Other possible uses include the bonding of medical devices, such as electrodes and various prosthetic devices to the tissue. Compounds of the invention are also highly effective in oral tissue applications.

The compounds employed in the adhesive of the invention are represented by the structural formula:

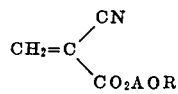

wherein A is a divalent straight or branched chain alkylene or oxyalkylene radical of from 2 to 8 carbon atoms, e.g., ethylene, tetramethylene, 3-oxapentylene ($-CH_2\ CH_2\ OCH_2\ CH_2-$), methylethylene and the like; R is a straight or branched alkyl group of from 1 to 8 carbon atoms (preferably from 1 to 4 carbon atoms) as typified by methyl, isopropyl, ethyl, and butyl. While all of the above described compounds or mixtures thereof may be used in practicing the invention the 2-methoxyethyl 2-cyanoacrylate, 2-ethoxyethyl 2-cyanoacrylate and 2-isopropoxyethyl 2-cyanoacrylate monomers appear to exhibit the most preferred properties for biological applications. Fluorinated alkoxyalkyl 2-cyanoacrylates, while not preferred, may be employed in the practice of the invention, particularly in cases where rapid degradation of the polymeric bond is not essential.

The invention further contemplates compositions comprising comonomeric mixtures including more than one compound of the invention as well as compositions comprising mixtures of the alkoxyalkyl 2-cyanoacrylates of the invention in conjunction with minor amounts (i.e. less than 50 mol percent) of other 2-cyanoacrylates which possess acceptable properties, e.g. unsubstituted alkyl and alkoxyalkyl 2-cyanoacrylates as well as fluoroalkyl 2-cyanoacrylates. Specific properties required of an adhesive composition for a particular application may be obtained by selectively varying the type and amount of the comonomeric components.

The method of the invention for bonding living mammalian tissues comprises applying a thin film of adhesive composition to at least one of the surfaces to be bonded, quickly bringing such surface into proper apposition with another surface and providing adequate contact time to allow the adhesive to polymerize undisturbed while in contact with both surfaces at normal body temperature. The adhesive composition may be applied from a dropper and spread with any appropriate surgical tool. For effecting hemostasis in bleeding tissue surfaces, the exuded blood is ordinarily sponged off and a thin film of adhesive is then applied over the injured surface and allowed to polymerize thereon thus effecting a seal which prevents the escape of blood or other body fluids. Alternatively, the adhesive composition may be applied as a fine aerosol spray using a suitable propellant. This mode of application is particularly effective when the adhesive in intended as a hemostatic agent for the control of hemorrhage.

One method of preparing high purity (95 percent or greater) alkoxyalkyl 2-cyanoacrylates of the invention involves condensing formaldehyde with an ester of the corresponding cyanoacetic acid in the presence of a mixture of an acid and the acid salt of an alkyl primary or secondary amine. Any salt of an alkyl primary or secondary amine and any free acid may be utilized as the components of the mixture provided they establish the necessary pH value as described in detail below. The resulting 2-cyanoacrylate polymers are then thermally depolymerized to obtain the desired monomers. Thermal depolymerization may be carried out by techniques described in U.S. Pat. Nos. 2,784,215; 2,721,858; and 2,763,677 and illustrated in the examples set out below. Specifically, the preparation of the above polymers employs the cyanoacetates corresponding to the desired cyanoacrylates, e.g., 2-ethoxyethyl 2-cyanoacetate for the preparation of 2-ethoxyethyl 2-cyanoacrylate. The cyanoacetate ester is reacted with formaldehyde or polymers thereof, as typified by paraformaldehyde. The presence of water should be avoided and therefore aqueous solutions of formaldehyde, such as formalin, are not useful. The reaction medium may be any suitable inert organic solvent capable of forming an azeotrope with water, such as benzene, toluene, etc. All phases of the synthetic sequence are carried out under acidic conditions. The necessary pH value for the mixture of acid and acid salts of an alkyl primary or secondary amine referred to above may be characterized as a "corrected pH value" of not over pH 5 and may be determined as follows. The exact amounts of amine acid salts and free acid to be used in the condensation step are dissolved in 25 ml. of water, and the pH of the solution is measured. If the resulting pH value is 5 or less, the mixture will adequately catalyze the condensation reaction. When the mixture is soluble in water, this is the "corrected pH value." Mixtures which are not readily soluble in water (e.g., those containing water insoluble organic acids) may be dissolved in 25 ml. of ethanol-water mixture; however, the measured pH must then be corrected as described by Gutbezahl, et al., J. Am. Chem. Soc., 75, 565 (1953). Both the amine salt and the free acid are always present. Glacial acetic or strong mineral acids, such as hydrochloric or sulfuric acid, are preferred. The amount of mixture employed is not critical and may be varied. Ordinarily a small amount, e.g., 0.5 to 1.0 percent by weight, based on the weight of cyanoacetic ester is adequate.

Except for the use of the amine salt and free acid mixture, the condensation of cyanoacetic esters with formaldehyde and the subsequent depolymerization process are carried out by methods similar to those reported in the literature.

Esters of cyanoacetic acid which are employed in the preparation of the desired cyanoacrylate polymers are readily preparable by direct esterification of cyanoacetic acid in the presence of an acid, such as sulfuric acid or the like, with alcohols represented by the formula:

HO-A-OR wherein A and R have the same values as described above.

While the above described condensation process for preparing the cyanoacrylates of the invention from the corresponding cyanoacetates is the preferred method, other methods known in the art for the preparation of alkyl 2-cyanoacrylates, such as base catalyzed condensation of formaldehyde or paraformaldehyde may be employed. See, e.g., U.S. Pat. Nos. 2,721,858 and 2,763,677.

The following examples will illustrate the preparation of compounds used in the invention as well as the methods of practicing the invention. It will be understood, however that the examples are included merely for purposes of illustration and are not intended to limit the scope of the invention.

EXAMPLE I

PREPARATION OF 2-ISOPROPOXYETHYL 2-CYANOACRYLATE

A mixture of 277.5 g. (1.62 moles) 2isopropoxyethyl cyanoacetate, 61.2 g. (204 moles) powdered paraformaldehyde, 1.6 g. piperidine hydrochloride and 3 cc. glacial acetic acid in 400 ml. benzene was heated under reflux until no additional water separated in a Dean-stark water trap. The resulting solution was diluted with 400 ml. acetone, filtered, combined with 175 g. tricresylphosphate and concentrated by distillation at reduced pressure. Polyphosphoric acid (6 g.) was added to the viscous residue and depolymerization was effected by heating this mixture under reduced pressure using a good sulfur dioxide bleed and rapid mechanical stirring. Crude product weighing 215 g. was collected in a Dry Ice-cooled receiver at a bath temperature/system pressure 188-—195°/1.3 mm. Redistillation from a small amount of phosphorus pentoxide in the presence of sulfur dioxide provided monomeric product which was shown by gas-liquid chromatographic analysis to be +98 percent pure.

EXAMPLE II

ADHESION OF TISSUES

Single midline skin incisions, 4 cm. in length were made in the dorsal neck region of 10 anesthetized Simonsen Sprague Dawley albino rats. Hemorrhage was preliminarily controlled by sponging with gauze; thereafter two drops of 2-isopropoxyethyl 2-cyanoacrylate were placed into the wound by means of a small squeeze vial and spread into a thin film along the wound edges using a glass rod. Immediately following adhesive application, the edges were apposed using digital pressure and Allis tissue forceps. The forceps were released after allowing sufficient time for bond formation to occur 60 to 90 seconds).

Each of the 10 animals recovered uneventfully after surgery and nine of the ten wounds treated appeared to be well apposed and healing normally 24 hours after sealing.

EXAMPLE III

HEMOSTASIS IN VASCULAR ORGANS (EXCISED RAT LIVER)

The livers of 6 ether-anesthetized Simonsen Sprague Dawley albino rats were exteriorized and the distal ¼ to ⅓ of the left lateral lobe of each liver was excised. Hemorrhage at the open surface of the remaining lobe was temporarily controlled by digital compression and sponging with gauze. Immediately after sponging, a thin film of 2-ethoxyethyl 2-cyanoacrylate was applied to the cut surface by means of a small squeeze vial and spread over the cut surface with a glass rod. After allowing sufficient time for polymerization of the monomer (about 30 seconds), the digital pressure was released, the liver was replaced into the peritoneal cavity, and the muscle and skin wounds were closed with conventional sutures. Adhesive and hemostatic properties were recorded at the time of application. Necropsies were performed with close examination of the livers, at 2, 4 and 8 weeks, respectively, after surgery, two of the test animals being examined at each interval.

In each case, the adhesive polymerized rapidly and provided rapid and complete hemostasis. All of the animals remained in good general health throughout the 2 to 8 week testing period.

EXAMPLE IV

INTESTINAL ANASTOMOSIS (DOG INTESTINE)

A dog was anesthetized with pentobarbital sodium and prepared for abdominal surgery. A 20 centimeter section of jejunum was surgically removed using soft clamping and ligation techniques. The intestinal ends were then apposed and joined with four silk Lembert sutures, size 4–0, 0, at the 12, 3, 6 and 9 0'clock positions causing the serosa to infold. Tension was placed on the sutures on each side of one quadrant causing additional serosal infolding. One drop of monomeric 2-ethoxyethyl 2-cyanoacrylate was then spread along the apposed serosal surfaces between the sutures in each quadrant. Sufficient time for polymerization to occur (about 2 minutes for each quadrant) was allowed before replacing the anastomosed intestine in the peritoneal cavity. The greater omentum was used to cover the intestine and ventral wound closure, except for the skin, was accomplished using conventional suture technique. The skin was finally sealed with 2-ethoxyethyl 2-cyanoacrylate.

The dog appeared to be in good health when euthanatized fourteen days after surgery. At necropsy the bowel was patent with only slight stenosis at the site of anastomosis. Although adhesions were present between the omentum and the intestine at the site of anastomosis and there was some evidence of mild inflammation on the mucosa, the site of anastomosis appeared to be healing in a normal manner.

EXAMPLE V

BIODEGRADATION OF POLYMER BY LIVING TISSUE

Polymeric discs of the compounds to be tested which measured approximately 4.0 mm. in diameter and 1.0 mm. in thickness were vacuum dried for 24 hours and then weighed. Each disc was then implanted in the dorsal subcutaneous neck tissue of female Swiss-Webster mice. At the end of the test period, the discs were surgically removed and vacuum-dried again for 24 hours. The discs were then reweighed to determine the percentage of weight loss due to biodegradation. The results for each compound are tabulated below:

TABLE A

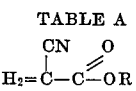

| Wherein R is: | Polymer absorption (percent) |
|---|---|
| (1). —CH$_2$CH$_2$OCH(CH$_3$)$_2$ | 34% in 16 weeks. |
| (2). —CHCH$_2$O CH$_3$<br>   \|<br>   CH$_3$ | 100% in 16 weeks. |
| (3). —CH$_2$CH$_2$O(CH$_2$)$_3$CH$_3$ | 54.7% in 16 weeks. |
| (4). —CH$_2$CH$_2$O CH$_2$CH$_3$ | 92.3% in 16 weeks. |
| (5). —CH$_2$CH$_2$O CH$_3$ | 100% in 16 weeks. |
| (6). —CH$_2$CHO CH$_3$<br>   \|<br>   CH$_3$ | 100% in 2 weeks. |
| (7). —CH$_3$ | 100% in 75 days. |
| (8). —(CH$_2$)$_4$H | 1.2% in 16 weeks. |
| (9). —CH(CH$_3$)$_2$ | 9% in 16 weeks. |

The results listed in Table A demonstrate that the rate of absorption of the "higher" alkyl 2-cyanoacrylates, (8) and (9), was substantially lower as compared with corresponding alkoxyalkyl 2-cyanoacrylates of the invention; for example, (4), (5) and (6). While methyl 2-cyanoacrylate (7) demonstrated a relatively high rate of absorption it possesses the disadvantages discussed earlier. With the exception of methyl 2-cyanoacrylate, each of the alkoxyalkyl 2-cyanoacrylates tested demonstrated a substantially higher rate of absorption than the alkyl 2-cyanoacrylates.

EXAMPLE VI

Single midline incisions in the dorsal neck region of Simonsen Sprague Dawley albino rats were closed with test adhesives in the manner of Example II and each wound was observed 24 hours after surgery. The ratios of the number of incisions which were completely closed with good alignment to the number of animals treated were observed for each compound and are noted in Table B below. Only those incisions which were perfectly sealed and aligned were rated as "closed." In some cases, improper closure was due to extraneous circumstances, such as errors in surgical technique.

Following 24 hour observation the animals having good incision closure and alignment were euthanatized and a section of skin tissue measuring 3.0 cm. by 2.0 cm., having the closed incision approximately in the center of the section, was dissected free. One edge of the tissue section was then securely attached in a fixed clamp and the opposite edge attached to a clamp having suspended therefrom a plastic container. Water was then allowed to flow into the container at a constant rate until the incision closure separated due to the weight of the water. The combined weight of the plastic container, the lower clamp and the added water was then measured and is recorded in Table B as "wound tensile strength."

TABLE B $$CH_2=C\begin{smallmatrix}CN\\|\\C\end{smallmatrix}\begin{smallmatrix}\\\diagup\\-OR\end{smallmatrix}$$

| Wherein R is: | No. closed/ No. treated | Wound tensile strength (Grams) |
|---|---|---|
| $-CH_2CH_2OCH(CH_3)_2$ | 9/10 | 543 (mean value of 9 runs). |
| $\begin{matrix}CHCH_2OCH_3\\|\\CH_3\end{matrix}$ | 8/10 | 348 (mean value of 8 runs). |
| $-CH_2CH_2O(CH_2)_3CH_3$ | 9/10 | 344 (mean value of 9 runs). |
| $-CH_2CH_2OCH_2CH_3$ | 9/10 | 460 (mean value of 9 runs). |
| $-CH_2CH_2OCH_3$ | 5/10 | 303 (mean value of 5 runs). |
| $\begin{matrix}-CH_2CHOCH_3\\|\\CH_3\end{matrix}$ | 8/10 | 386 (mean value of 8 runs). |

We claim:

1. A method for surgically adhering living tissues which comprises applying a rapidly polymerizing adhesive composition to at least one tissue surface, bringing another tissue surface into contact therewith, and maintaining the said surfaces in contact until polymerization of the adhesive composition has occurred, said adhesive composition comprising at least one compound represented by the structural formula

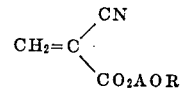

wherein A is a divalent straight or branched chain alkylene or oxyalkylene radical having from 2 to 8 carbon atoms, and R is a straight or branched alkyl radical having from 1 to 8 carbon atoms.

2. The method of claim 1 wherein said compound is 2-methoxyethyl 2-cyanoacrylate.

3. The method of claim 1 wherein said compound is 2-ethoxyethyl 2-cyanoacrylate.

4. The method of claim 1 wherein said compound is 2-butoxyethyl 2-cyanoacrylate.

5. The method of claim 1 wherein said compound is 2-isopropoxyethyl 2-cyanoacrylate.

6. The method of claim 1 wherein said compound is 2-methoxypropyl 2cyanoacrylate.

7. The method of claim 1 wherein said compound is 2-(1-methoxy)-propyl 2-cyanoacrylate.

8. A method for adhering a prosthetic device to living tissue which comprises applying a rapidly polymerizing adhesive composition to said tissue, bringing said prosthetic device into contact therewith and maintaining the tissue and the device in contact with each other until polymerization of the adhesive has occurred, said adhesive composition comprising at least one compound represented by the structural formula:

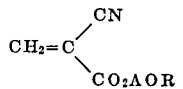

wherein A is a divalent straight or branched chain alkylene or oxyalkylene radical having from 2 to 8 carbon atoms, and R is a straight or branched alkyl radical having from 1 to 8 carbon atoms.

9. A method of repairing damaged living tissues to prevent the escape of fluids (including blood) therethrough which comprises applying to said tissue a thin film of a rapidly polymerizing composition comprising at least one compound having the structural formula:

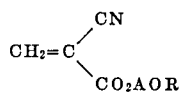

wherein A is a divalent straight or branched chain alkylene or oxyalkylene radical having from 2 to 8 carbon atoms, and R is a straight or branched alkyl radical having from 1 to 8 carbon atoms.

10. The method of claim 9 wherein the compound is 2-methoxyethyl 2-cyanoacrylate.

11. The method of claim 9 wherein the compound is 2-ethoxyethyl 2-cyanoacrylate.

12. The method of claim 9 wherein the compound is 2-butoxyethyl 2-cyanoacrylate.

13. The method of claim 9 wherein the compound is 2-isopropoxyethyl 2-cyanoacrylate.

14. The method of claim 9 wherein the compound is 2-methoxypropyl 2-cyanoacrylate.

15. The method of claim 9 wherein the compound is 2-(1-methoxy)-propyl 2-cyanoacrylate.

UNITED STATES PATENT OFFICE
CERTIFICATE OF CORRECTION

Patent No. 3,559,652    Dated February 2, 1971

Inventor(s) Elden H. Banitt and Robert A. Nelson

It is certified that error appears in the above-identified patent and that said Letters Patent are hereby corrected as shown below:

Column 1, line 44 between "body" and the comma add --[J. Biomed. Mater. Res., 1, 3-9 (1967), Arch. Sur 94: 861 (1967)]--.

Column 1, line 46 after "applications" before period add -- [Arch. Surg., 93, 428 (1967), Arch. Surg 94, 153, (1967)] --.

Column 1, line 56, after "homologues" and before period add --[J. Biomed. Mater. Res., 1, 3-9 (1967)]--.

Column 2, line 40, delete "1967" second occur

Column 5, line 28, "(204 moles)" should read --(2.04 moles)--.

Column 6, line 22, "4-0,0," should read --4-0,--.

Signed and sealed this 6th day of July 1971.

(SEAL)
Attest:

EDWARD M. FLETCHER, JR.
Attesting Officer

WILLIAM E. SCHUYLER, J
Commissioner of Patent